United States Patent [19]
Okamoto et al.

[11] Patent Number: 5,915,352
[45] Date of Patent: Jun. 29, 1999

[54] IN-CYLINDER FUEL INJECTION DEVICE AND INTERNAL COMBUSTION ENGINE MOUNTING THE SAME

[75] Inventors: Yoshio Okamoto, Minori-machi; Minoru Ohsuga, Hitachinaka; Tohru Ishikawa, Kitaibaraki; Masahiro Souma, Hitachi, all of Japan

[73] Assignees: Hitachi, Ltd., Tokyo; Hitachi Car Engineering Co., Ltd., Hitachinaka, both of Japan

[21] Appl. No.: 08/796,558

[22] Filed: Feb. 7, 1997

[30] Foreign Application Priority Data

Feb. 14, 1996 [JP] Japan .................................. 8-26453

[51] Int. Cl.⁶ ...................................... F02B 3/00
[52] U.S. Cl. .................. 123/298; 123/306; 239/DIG. 19; 239/463
[58] Field of Search ............................. 239/463, 533.12, 239/DIG. 19; 123/305, 306, 298

[56] References Cited

U.S. PATENT DOCUMENTS

| | | | |
|---|---|---|---|
| 4,245,589 | 1/1981 | Ryan | 123/298 |
| 4,971,254 | 11/1990 | Daly et al. | 239/533.12 |
| 4,981,266 | 1/1991 | Aichele | 239/463 |
| 5,018,501 | 5/1991 | Watanabe et al. | 123/472 |
| 5,207,384 | 5/1993 | Horsting | 239/463 |
| 5,285,969 | 2/1994 | Greiner et al. | 239/463 |
| 5,307,997 | 5/1994 | Wakeman . | |
| 5,360,166 | 11/1994 | Nogi et al. . | |
| 5,570,841 | 11/1996 | Pace et al. | 239/585.1 |

FOREIGN PATENT DOCUMENTS

| | | |
|---|---|---|
| 531495 | 9/1954 | Belgium . |
| 0151793 | 8/1985 | European Pat. Off. . |
| 290996 | 8/1953 | Germany . |
| 1526709 | 3/1970 | Germany . |
| 3623221 | 2/1988 | Germany . |
| 3735526 | 5/1988 | Germany . |
| 251121 | 4/1926 | United Kingdom . |
| 2069045 | 8/1981 | United Kingdom . |
| WO 88 03226 | 5/1988 | WIPO . |

OTHER PUBLICATIONS

Patent Abstracts of Japan, vol. 007, No. 165 (M–230), Jul. 20, 1983 and JP 58 072671A (Hitachi Zosen KK), Apr. 1983.

*Primary Examiner*—Thomas N. Moulis
*Attorney, Agent, or Firm*—Antonelli, Terry, Stout & Kraus, LLP

[57] ABSTRACT

A fuel injection device directly injecting fuel into a cylinder is exposed to combustion flame and is heated to nearly 300° C. Under such a temperature condition, deposits of carbonization-growing materials of the injected gasoline and a mixture of engine lubricant and the gasoline and soot produced from the deposits become attached onto the end portion of the fuel injection device. By preventing a change in the fuel injection characteristic with time by preventing of deposits and soot from attaching to the fuel injection device, an engine can be maintained in a normal combustion state for a long time. In order to attain this object, a cylindrical cover member with a bottom made of a high thermal conductive material is mechanically fixed to the end portion of the electromagnetic fuel injection valve through an insulator. The cover member is heated by combustion heat of the engine up to a temperature higher than a deposit producing temperature, and accordingly deposits which tend to attach onto the cover member are eliminated.

12 Claims, 9 Drawing Sheets

IN-CYLINDER FUEL INJECTION DEVICE AND INTERNAL COMBUSTION ENGINE MOUNTING THE SAME

BACKGROUND OF THE INVENTION

The present invention relates to an internal combustion engine of the in-cylinder fuel injection type in which gasoline is directly injected into a combustion chamber of the engine, and more particularly to a fuel injection valve of the electromagnetic type for directly injecting fuel into the combustion chamber.

Among the various types of internal combustion engines, a conventionally widely used gasoline engine has fuel injected into an air-intake port thereof using an electromagnetic valve. Intake air and the injected fuel are mixed inside the air-intake port, and the mixed gas is then supplied to and is ignited and burned in a combustion chamber of the engine to generate power.

On the other hand, in a diesel engine, which mainly uses light oil as a fuel, among internal combustion engines, fuel is directly injected into a combustion chamber of the engine, and the fuel is burned in spontaneous combustion by compressed air inside the combustion chamber to generate power. Thus, in the type of gasoline engine described above, an in-cylinder fuel injection directly into the combustion chamber of the engine has been proposed in order to improve the response of the internal combustion engine.

In such a gasoline engine of in-cylinder fuel injection type, since a spark plug is provided at the top of the combustion chamber as an ignition means in contrast to a diesel engine, the space available for location of the electromagnetic fuel Injection valve is limited. That is, if the temperature of a position near the exhaust valve becomes high, the fuel injection valve cannot be placed there. On the other hand, since the air-intake valve side is less affected by the combustion gas though there is an intake passage there, it has been proposed that the electromagnetic fuel injection valve be installed near the air-intake valve.

Even if the electromagnetic fuel injection valve is installed near the air-intake valve in the cylinder head, the temperature of the cylinder head of the gasoline engine reaches 250 to 300° C. during operation of the engine. Therefore, the end portion of the electromagnetic fuel injection valve is also heated up to near the same temperature. Under such a high temperature condition, the production and accumulation of deposits of carbonization-growing materials in the injected gasoline and a mixture of engine lubricant and the gasoline is accelerated. Most of the deposits are amorphous flakes. However, when the temperature is increased, the carbonization progresses further to form soot with a grain structure having a size of several tens of nano-meters. The deposits and the soot attach to and accumulate on the wall surface of the combustion chamber and the exposed portion of the electromagnetic fuel injection valve.

In order to solve the problem of accumulation of deposits and soot, Japanese Patent Application Laid-Open No. 3-225068 proposes that an externally opening valve be employed, and ring-shaped projections projecting outward are provided in the peripheral portion of the end of the valve head and in the peripheral portion of an opening of the fuel injection nozzle of the valve body. By doing so, appropriate fuel injection is performed under conditions wherein the projections concentratively receive heat from the engine as compared to the other parts of the valve and the temperature of the projection is locally increased to suppress formation of deposits due to attached fuel drops.

Japanese Patent Application Laid-Open No. 6-147022 discloses a fuel injection device for directly injecting fuel into a combustion chamber in which exhaust gas is recirculated in order to decrease NOx exhaust.

In general, the deposits and the soot which attach onto the wall surface of the combustion chamber are not considered a problem since they increase the thermal insulating efficiency so as to improve the combustion efficiency. However, when deposits become attached to and accumulate at the valve portion of the electromagnetic fuel injection valve, particularly near the fuel injection nozzle and at an inside portion of the fuel injection nozzle provided at the end portion of the electromagnetic fuel injection valve, the injecting direction and the fuel spray shape are changed and the fuel mist particle size becomes large. Therefore, the engine operation is affected not only by a decreased combustion efficiency, but the fuel injection nozzle also becomes choked and the injection resistance is increased. As a result, a desired amount of fuel cannot be injected. In a worst case, the fuel injection nozzle becomes completely blocked so that fuel cannot be injected at all, and consequently the engine will not run.

Therefore, in the case of Japanese Patent Application Laid-Open No. 3-225068 described above, it is an objective to form a hot spot, which is locally increased to a high) temperature, to decrease the generation of deposits and soot. However, since the heat capacity of the hot spot is small, the temperature is rapidly decreased during the intake stroke and deposits are generated at that time, which deposits are carbonized in the next combustion stroke. Therefore, there is a possibility that the desired effect cannot always be obtained.

On the other hand, in the case of Japanese Patent Application Laid-Open No. 6-147022 described above, although Nox exhaust is reduced, the effect of deposits and soot which become attached near the injection nozzle of the fuel injection valve is not sufficiently considered, and so there is a possibility that such deposits will cause degradation in the performance of the fuel injection valve.

The inventors of the present invention have experimentally studied an in-cylinder fuel injection device which is capable of use in a gasoline engine while taking the results of the conventional technology into consideration. As a result, the following facts have been revealed.

(1) When the spread angle of fuel spray particles injected from a fuel injection valve is narrow, the penetrating force of the fuel spray, that is, the kinetic energy in the injecting direction becomes large. However, when the fuel spray particles reach an inner wall surface of the cylinder facing the fuel spray, the fuel spray particles form a film thereon. The fuel film takes a long time to evaporate, and so a part of the fuel does not completely evaporate, but remains to form a mixture having a dense fuel concentration, thereby resulting in a red-flame burning to create a lot of soot.

(2) On the other hand, when the spread angle of fuel spray particles is sufficiently wide, the penetrating force of the fuel spray becomes weak. Further, the fuel spray particles hit on a portion of the air-intake valve projecting into the cylinder, and so a part of the fuel spray particles hit the inner wall surface of the cylinder head, so as to again form a film on the cylinder wall in as the same manner as described in the item (1) above. The fuel spray particles which become attached onto the portion of the air-intake valve are re-atomized by the intake air flowing into the cylinder to moderate the bad effect on combustion. The fuel which becomes attached onto the cylinder head, on the other hand, burns with a red-flame since it takes a long time to evaporate for the same reasons as described in the item (1) above.

(3) A spark plug is arranged near the central portion of the cylinder head, and when fuel attaches to the spark plug, normal generation of a spark is not possible and consequently combustion cannot be started.

From the above results, in order to properly operate an engine over a wide speed range from starting to a rated speed state after starting, it is preferable that the spread angle of fuel spray particles is set to 60° to 90°. Further, it has been found that there is an appropriate range in the spread angle of fuel spray particles depending on the operating condition of the engine. For example, it is preferable to produce an optimum fuel injection condition where the spread angle of the fuel spray particles is suppressed to a small value, namely nearly 60°, to form a good flammable condition when the temperature of the wall surface is low, such as at starting time, and to widen the spread angle of the fuel spray particles, namely to nearly 90°, to disperse the mixture of fuel and air and to decrease the amount of soot being generated by suppressing local red-flame burning, when the combustion has progressed and the temperature of the wall surface becomes high.

Various shapes are proposed for the nozzle of an electromagnetic fuel injection valve for producing fuel spray particles. The inventors of the present invention have recognized that freedom in the forming of a fuel spray is increased by giving a swirl to the fuel on the upstream side of a single hole orifice, and that the combustion results described above can be obtained by adjusting the spread angle of the fuel spray particles by giving a swirl to the fuel on the upstream side of a single hole orifice. on the other hand, in an electromagnetic fuel injection valve of this type, deposits and soot attach onto the injection valve itself. The reason is that the temperature of the surface of the fuel injection valve is heated up to 170° C. to 200° C. by heat directly received from combustion and by heat conduction from the cylinder head, and it is estimated that the end portion of the fuel injection valve reaches an even higher temperature, since it is exposed to the combustion gas.

SUMMARY OF THE INVENTION

In providing an electromagnetic fuel injection valve which is capable of directly injecting fuel into a combustion chamber of an internal combustion engine, an object of the present invention is to solve the aforementioned problems in the prior art by preventing deposits and soot from attaching to and accumulating onto the vicinity of the injection nozzle, thereby reducing the time varying degradation in the performance of the fuel injection valve.

In providing an internal combustion engine using an electromagnetic fuel injection device which is capable of directly injecting fuel into a combustion chamber of the engine, another object of the present invention is to maintain normal operation of the internal combustion engine.

A further object of the present invention is to provide an electromagnetic fuel injection device which is capable of directly injecting fuel into a combustion chamber of an internal combustion engine and which is low in cost and has a long life.

A still further object of the present invention is to provide an electromagnetic fuel injection valve which is capable of directly injecting fuel into a combustion chamber of an internal combustion engine and which can continue atomizing fuel for a long time.

In an internal combustion engine using an electromagnetic fuel injection device which is capable of directly injecting fuel into a combustion chamber of an internal combustion engine, a still further object of the present invention is to maintain normal operation of the engine.

A further object of the present invention is to provide a fuel injection device, and an internal combustion engine using the fuel injection device, which can accurately measure a fuel flow rate necessary for the internal combustion engine, even when deposits and soot become attached onto the fuel injection device.

A first embodiment of the present invention to attain the above objects is an in-cylinder fuel injection device, for directly injecting fuel into a combustion chamber of an internal combustion engine, in which a fuel passage for passing fuel is formed, wherein the in-cylinder fuel injection device further comprises a valve member for opening and closing the fuel passage, a fuel swirl member for giving a swirl to fuel, the fuel swirl member being provided on the upstream side of an opening and closing portion of the valve member, a fuel injecting hole member having a through hole for passing fuel, the fuel injecting hole member being provided on the downstream side of the opening and closing portion, and a cover member for covering the fuel injecting hole member, the cover member having an injecting hole and being made of a high thermal conductive material.

It is preferable if the cover member is made of any one of a brass and an aluminum alloy. It is also preferable if the cover member has at least one concave portion at a contact surface side with the fuel injection member. Further, it is preferable that the surface temperature near the injecting hole of the cover member is raised to a temperature from 550° C. to 1050° C. during operation of the internal combustion engine.

A second embodiment of the present invention to attain the above objects is an in-cylinder fuel injection device, for directly injecting fuel into a combustion chamber of an internal combustion engine, in which a fuel passage for passing fuel is formed, wherein the in-cylinder fuel injection device further comprises a valve member for opening and closing the fuel passage, a fuel swirl member for giving a swirl to fuel, the fuel swirl member being provided on the upstream side of an opening and closing portion of the valve member, and a fuel injecting hole member having a through hole for passing fuel, the fuel injecting hole member being provided on the downstream side of the opening and closing portion, wherein the fuel injecting hole member has a thermal conductance improving feature for improving the thermal conductance of the portion facing the combustion chamber of the internal combustion engine.

It is preferable if the thermal conductance improving feature includes an increased surface area resulting from the provision of projections or depressions on a surface facing the combustion chamber. It is also preferable if the thermal conductance improving feature includes a surface vapor-deposited layer for increasing thermal conductance.

A third embodiment of the present invention to attain the above objects is an in-cylinder fuel injection device, for directly injecting fuel into a combustion chamber of an internal combustion engine, in which a fuel passage for passing fuel is formed, wherein the in-cylinder fuel injection device further comprises a valve member for opening and closing the fuel passage, a fuel swirl member for giving a swirl to fuel, the fuel swirl member being provided on the upstream side of an opening and closing portion of the valve member, a fuel injecting hole member having a through hole for passing fuel, the fuel injecting hole member being provided on the downstream side of the opening and closing portion, a cover member for covering the fuel injecting hole member, the cover member having an injecting hole made of a high thermal conductive material, and a thermal convection preventing means for preventing thermal convection from the cover member to the fuel injecting hole member, the thermal convection means being provided between the cover member and the fuel injecting hole member.

In any one of the aforementioned embodiments, it is preferable if the distance in the axial direction of the narrowest portion of the through hole provided in the fuel injecting hole member is within the range of 0.1 to 0.4 mm.

A fourth embodiment of the present invention to attain the above objects is an in-cylinder fuel injection device, for directly injecting fuel into a combustion chamber of an internal combustion engine, in which a fuel passage for passing fuel is formed, wherein the in-cylinder fuel injection device further comprises a valve member for opening and closing the fuel passage, a fuel swirl member for giving a swirl to fuel, the fuel swirl member being provided on the upstream side of an opening and closing portion of the valve member, and a fuel injecting hole member having a through hole for passing fuel, the fuel injection hole member being provided on the downstream side of the opening and closing portion, wherein the amount of fuel to be injected into the internal combustion engine is measured in the opening and closing portion of said valve member.

Further, a fifth embodiment of the present invention is an in-cylinder fuel injection device, for directly injecting fuel into an combustion chamber of an internal combustion engine, in which a fuel passage for passing fuel is formed, wherein the in-cylinder fuel injection device comprises a ball valve member for opening and closing the fuel passage, a fuel swirl member for giving a swirl to fuel, the fuel swirl member being provided on the upstream side of an opening and closing portion of the ball valve member, a through hole member having a through hole for passing fuel, the through hole member being provided on the downstream side of the opening and closing portion, and a cover member for covering the through hole member, the cover member having a fuel injecting hole in the center thereof, wherein an opening flow passage area (SV) of the opening and closing portion of the ball valve member and a flow passage area (SO) of the fuel injecting hole formed in the cover member satisfy the relationship SV<SO.

In any one of the above embodiments, it is preferable if the in-cylinder fuel injection device is provided as an electromagnetic type fuel injection device.

Furthermore, the present invention is directed to an internal combustion engine comprising a cylinder, a cylinder head for covering an upper portion of the cylinder, an intake manifold forming an intake air passage for guiding intake air into the cylinder, an exhaust manifold forming an exhaust gas passage for guiding exhaust gas out of the cylinder, an intake valve for opening and closing the intake air passage, an exhaust valve for opening and closing the exhaust gas passage, and a spark plug, wherein a fuel injection device for directly injecting fuel into a combustion chamber is mounted in the cylinder head and projects into the cylinder, and the fuel injection device comprises a fuel flow passage for passing fuel therethrough, a valve member for opening and closing the fuel passage, a fuel swirl member for giving a swirl to fuel, the swirl member being provided on the upstream side of an opening and closing portion of the valve member, a fuel injecting hole member having a through hole for passing fuel, the fuel injecting hole member being provided on the downstream side of the opening and closing portion, and a cover member for covering the fuel injecting hole member, which cover member is made of either a brass or an aluminum alloy.

Still further, the present invention is directed to an internal combustion engine comprising a cylinder, a cylinder head for covering an upper portion of the cylinder, an intake manifold forming an intake air passage for guiding intake air into the cylinder, an exhaust manifold forming an exhaust gas passage for guiding exhaust gas out of the cylinder, an intake valve for opening and closing the intake air passage, an exhaust valve for opening and closing the exhaust gas passage, and a spark plug, wherein a fuel injection device for directly injecting fuel into a combustion chamber is mounted in the cylinder head and projects into the cylinder, and the fuel injection device comprises a fuel flow passage for passing fuel, a valve member for opening and closing the fuel passage, a fuel swirl member for giving a swirl to fuel, the fuel swirl plate being provided on the upstream side of an opening and closing portion of the valve member, a fuel injecting hole member having a through hole for passing fuel, the fuel injecting hole member being provided on the downstream side of the opening and closing portion, a cover member for covering the fuel injecting hole member, the cover member being made of either a brass or an aluminum alloy, and a thermal convection preventing means for preventing thermal convection from the cover member to the fuel injecting hole member, the thermal convection preventing means being provided between the cover member and the fuel injecting hole member.

Further, the present invention is directed to an internal combustion engine comprising a cylinder, a cylinder head for covering an upper portion of the cylinder, an intake manifold forming an intake air passage for guiding intake air into the cylinder, an exhaust manifold forming an exhaust gas passage for guiding exhaust gas out of the cylinder, an intake valve for opening and closing the intake air passage, an exhaust valve for opening and closing the exhaust gas passage, and a spark plug, wherein a fuel injection device for directly injecting fuel into a combustion chamber is mounted in the cylinder head and projects into the cylinder, and the fuel injection device comprises a fuel flow passage for passing fuel therethrough, a ball valve member for opening and closing the fuel passage, a fuel swirl member for giving a swirl to fuel, the fuel swirl member being provided on the upstream side of an opening and closing portion of the ball valve member, a through hole member having a through hole for passing fuel, the through hole member being provided on the downstream side of the opening and closing portion, and a cover member for covering said through hole member in the center thereof, wherein an opening flow passage area (SV) of the opening and closing portion of the ball valve member and a flow passage area (SO) of the fuel injecting hole formed in the cover member satisfy the relationship SV<SO.

According to the present invention, since the cover member including the fuel injecting hole is heated by the heat of combustion up to the cleaning temperature of deposits, it is possible to prevent deposits and soot changed from the deposits from attaching to and accumulating onto the end portion of the electromagnetic fuel injection valve.

Further, since an amount of fuel is measured by the valve seat of the ball valve, a necessary amount of fuel can be supplied to the internal combustion engine even if deposits and soot become attached onto the exit portion of the electromagnetic fuel injection valve.

Therefore, in an electromagnetic fuel injection valve capable of directly injecting fuel into the combustion chamber of an internal combustion engine, it is possible to prevent deposits and soot from attaching to and accumulating onto the surrounding area of the injecting hole, thereby to decrease the time varying degradation of the performance of the fuel injection valve.

Further, in an internal combustion engine using an electromagnetic fuel injection valve which is capable of directly injecting fuel into the combustion chamber thereof, it is possible to maintain normal operation of the internal combustion engine.

Furthermore, it is possible to provide an electromagnetic fuel injection device which is capable of directly injecting fuel into the combustion chamber of an internal combustion engine and which is low in cost and has a long life.

Still further, it is possible to provide an electromagnetic fuel injection valve which is capable of directly injecting fuel into the combustion chamber of an internal combustion engine and which can continue atomization of fuel for a long time.

Further, it is possible to provide an internal combustion engine using an electromagnetic fuel injection valve which is capable of directly injecting fuel into the combustion chamber thereof so as to maintain normal operation of the engine.

Although it has been difficult with regard to the life-time and reliability of a fuel injection valve to realize direct in-cylinder fuel injection, it is possible with the present invention to maintain the injection performance, to optimize the fuel spray shape and to promote atomization, and accordingly to maintain normal operation of an engine for a long time.

DETAILED DESCRIPTION OF THE PREFERRED EMBODIMENTS

An embodiment of the present invention will be described in detail below with reference to the accompanying drawings.

Figure 1:
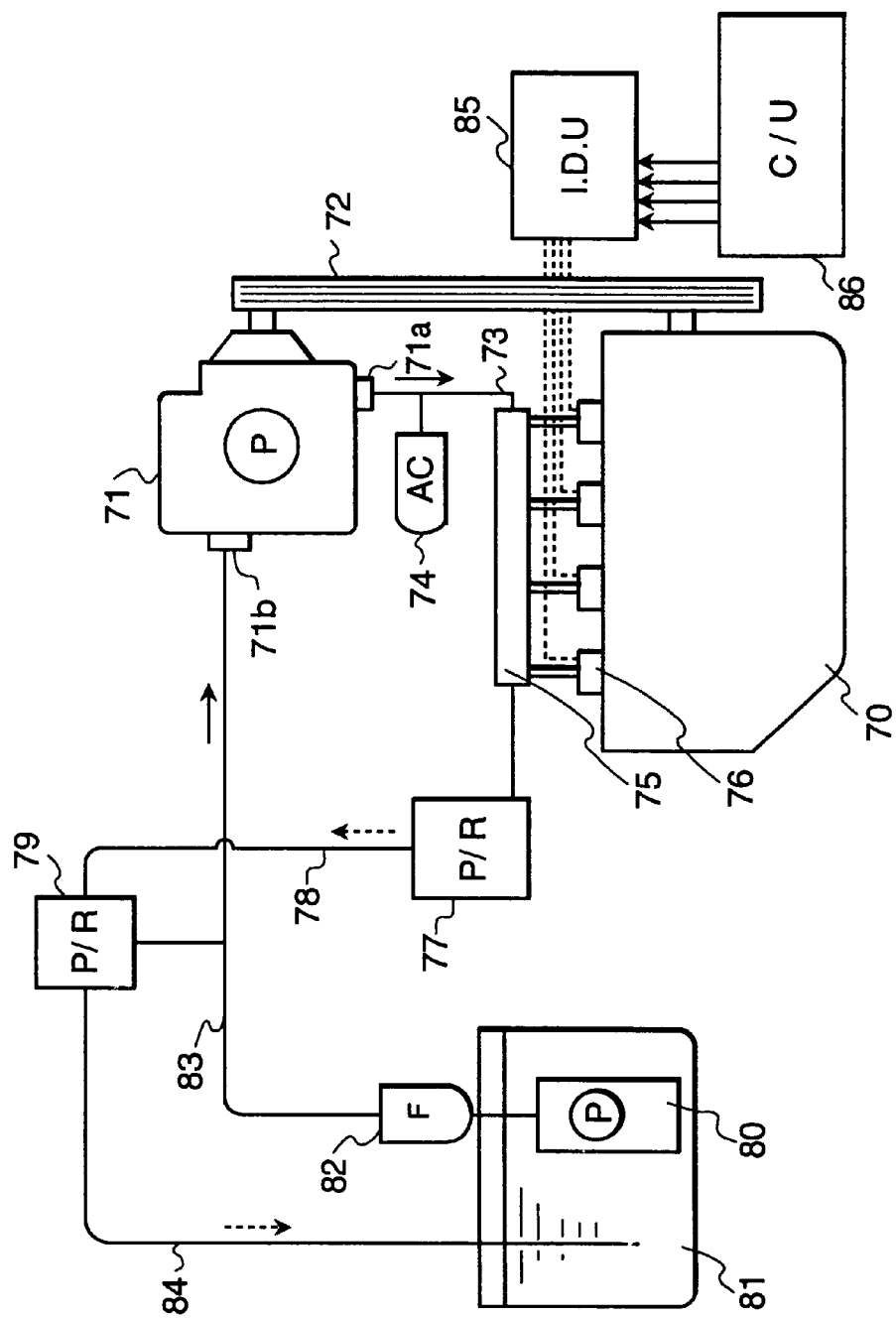
FIG. 1 is a schematic diagram showing the system of an internal combustion engine of the in-cylinder fuel injection type in which fuel is directly injected into the combustion chamber in accordance with the present invention.
Figure 2:
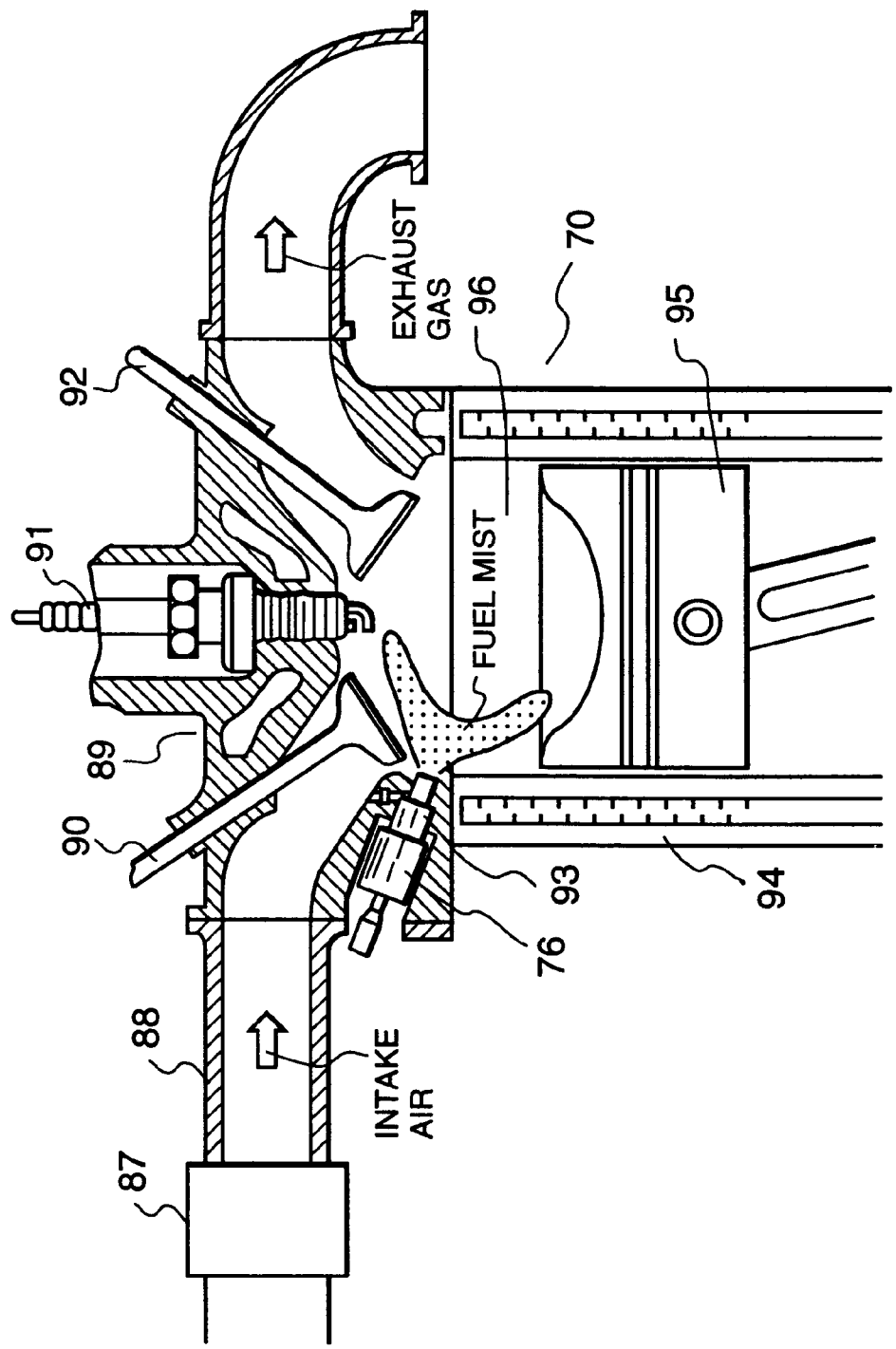
FIG. 2 is an enlarged sectional view of one cylinder of an engine in the system of FIG. 1.

FIG. 1 and FIG. 2 show an internal combustion engine employing an embodiment of an electromagnetic fuel injection valve in accordance with the present invention, which fuel injection valve is capable of directly injecting fuel into the combustion chamber of the engine. Referring to FIG. 1, a four-cylinder four-cycle gasoline engine 70 is connected to a high pressure fuel pump 71 through a belt 72. The high pressure fuel pump 71 is a mechanism to obtain a high pressure fuel flow by pressurizing fuel through cam driving, for example, by driving a piston to pressurize the fuel, and has a delivery port 71a and a suction port 71b. The delivery port 71a and a fuel gallery 75 are connected by a high pressure pipe 73, and an accumulator 74 is arranged in the middle of the high pressure pipe 73. In-cylinder fuel injection devices 76, to be described later, are arrayed and connected to the fuel gallery 75.

A high pressure regulator 77 for maintaining the pressure of the fuel flow supplied to the in-cylinder fuel injection devices 76 is arranged on the downstream side of the fuel gallery 75, and surplus fuel is guided from the fuel gallery 77 to a low pressure regulator 79 through a low pressure pipe 78 and is returned to a fuel tank 81 through a return pipe 84 connected to the low pressure regulattr 79. A low pressure fuel pump 80 is installed inside the fuel tank 81 and is connected to the suction side of the high pressure fuel pump 71 through a filter 82 and a low pressure pipe 83. Any excess in the fuel supplied from the low pressure fuel pump 80 to the high pressure fuel pump 71 is guided to the low pressure regulator 79 through a branch pipe provided in the middle of the low pressure pipe 83 and is returned to the fuel tank 81 through the return pipe 84.

The number of in-cylinder fuel injection devices 76 which are provided corresponds to the number of cylinders. A driver circuit 85 for controlling the in-cylinder fuel injection devices 76 is connected to an engine control unit 86 and controls the flow rate of fuel supplied to each of the in-cylinder fuel injection devices 76 corresponding to various commands received from the engine control unit 86. The control unit 86 controls the engine 70 based on operating information, such as intake air flow rate, air temperature, engine water temperature, engine speed and so on.

The internal combustion engine 70 constructed as described above will be described in more detail with reference to FIG. 2.

A piston 95 reciprocally movable inside the cylinder 94 moves upward and downward in the cylinder 94 in response to rotation of the engine shaft, not shown. A cylinder head 89 is attached on the upper portion of the cylinder 94 to form a closed combustion space together with the cylinder 94. In the cylinder head 89 there are formed an intake manifold 88, for introducing external air into the cylinder through an intake air flow rate control unit 87 containing a throttle valve, and an exhaust manifold, for exhausting combustion gas burned inside the cylinder 94.

In the cylinder head 89, there are provided an intake valve 90 in the side of the intake manifold 88, a spark plug 91 in the center and an exhaust valve 92 on the side opposite to the intake valve 90. Value portions provided at the ends of the valve stems of the intake valve 90 and the exhaust valve 92 are extended into the combustion chamber 96 to open the valves. An in-cylinder fuel injection device 76 in accordance with the present invention is attached to the cylinder head near the junction portion of the intake manifold 87 and is set so that the direction of injection of fuel extends slightly downward in the combustion chamber 96. In the side portion of the in-cylinder fuel injection device 76, there is provided an intake air introducing passage 93 for supplying a part of the intake air to the in-cylinder fuel injection device 76.

Fuel for the internal combustion engine 70 is directly injected into the combustion chamber 96 by the in-cylinder fuel injection device 76 in synchronism with the introduction of intake air. In the combustion chamber 96, the fuel atomized by injection is mixed with the air introduced through the intake manifold 88, compressed in the compression stroke and then fired by the spark plug 91 so to be burned.

As described in the "Background of the Invention", in the method where the fuel injection device 76 is attached onto the cylinder head 89 to directly inject fuel into the combustion chamber 96, steps are taken to reduce generation of NOx, CO, HC and so on, compared to the conventional electromagnetic fuel injection device, by adjusting the air/fuel ratio to the lean side, but there occurs a disadvantage from such a lean burn condition in that deposits and soot are apt to attach to the end portion of the fuel injection device 76, since it is exposed to the combustion gas. A fuel injection device 76 which can reduce the amount of deposits and soot attaching thereto will be described below, referring to FIG. 3.

Figure 3:
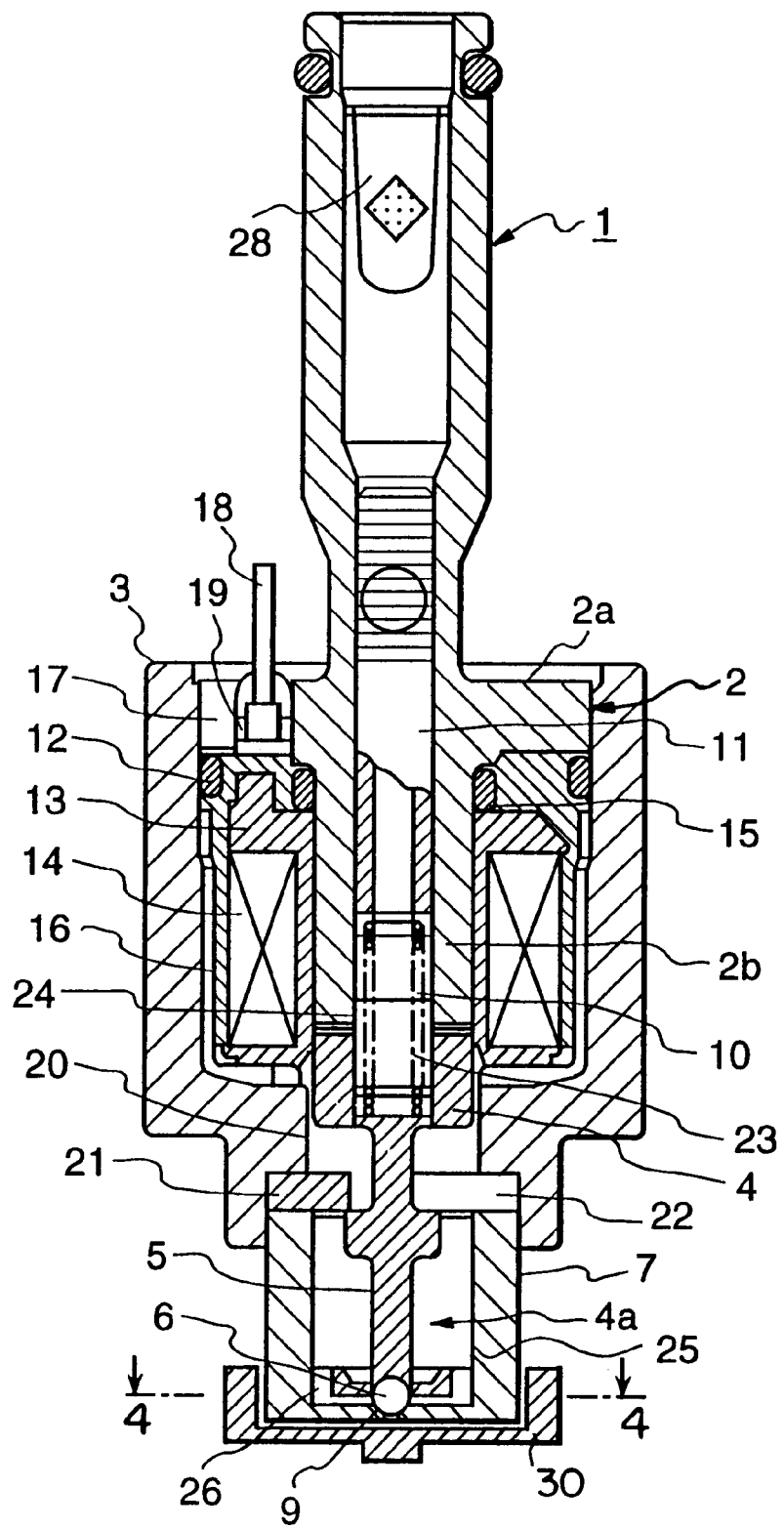
FIG. 3 is a vertical cross-sectional view showing an embodiment of an in-cylinder fuel injection device in accordance with the present invention.

FIG. 3 shows an embodiment of an electromagnetic fuel injection valve forming the fuel injection device 76.

The electromagnetic fuel injection valve 1 controls fuel injection by opening and closing a valve seat formed between a ball valve 6 and a nozzle member 7 corresponding to an ON-OFF signal having a duty ratio calculated in and obtained from the control unit. A magnetic circuit is composed of a cylindrical yoke 3, a core 2 and a plunger 4, which faces the core 2 with a gap, and the core 2 is composed of a plug body portion 2a for closing an upper open end of the yoke 3 and a column portion 2b extending along the center line of the yoke 3. There is formed an axial hole through the center of the column portion 2b to form a fuel flow passage. Inside the hole there is inserted a spring 10 forming an elastic member which presses a movable portion 4a composed of the plunger 4 and the ball valve 6 against the valve seat 9 formed in the upper surface of a nozzle member 7. The nozzle member 7 has a hole 8 for passing fuel to a position downstream of the contact portion of the ball valve 6 and the valve seat 9.

The upper end portion of the spring 10 is in contact with the lower end portion of a spring adjuster 11 for adjusting the opening and closing force of the ball valve, and the spring adjuster 11 is inserted in the center of the core 2. In order to prevent fuel from flowing out through a gap between the core 2 and the yoke 3, an O-ring 12 is provided between these elements. A coil 14 for exiting the magnetic circuit is wound around a bobbin 13, and the periphery is molded with a plastic material. A terminal 18 of the coil assembly 16, which includes the core 2, the coil 3 and the bobbin 13, is inserted into a cylindrical opening 17 provided in the upper end portion of the core 2, and an O-ring 19 is interposed between the terminal 18 and the core 2.

A plunger receiving portion 20 engaging with the plunger 4 is bored near the lower end portion of the yoke 3, and under the plunger receiving portion 20 there is positioned a nozzle receiving portion 22 having a larger diameter than the plunger receiving portion 20 so as to engage with a stopper surface 21, and a nozzle member 7 is inserted against the portion 22 within the end of the yoke.

A movable portion 4a comprises a plunger 4 made of a magnetic material, a rod 5 jointed to the plunger 4 in one end and a ball valve 6 at the other end, and a guide ring 23 is fixed to the upper end portion of the plunger 4 and is made of a non-magnetic material. Further, a cylindrical fuel swirl element 26 is inserted into an inner wall of the hollow portion of the nozzle member 7. The guide ring 23 is guided by an inner wall of a hollow portion bored in the top end of the core 2, and the ball 6 is guided by the inner peripheral surface 27 of the fuel swirl element 26. In the nozzle member 7, the valve seat 9 is formed following the cylindrical fuel swirl element 26, and an opening 8 is provided in the center of the valve seat 9 so that fuel can flow through the opening 8. The stroke (upward moving amount in the axial direction) of the movable portion 4a is determined by the dimension of the gap between an abutting surface of the neck portion 5a of the rod 5 and the stopper 21. In order to prevent dust or foreign material in the fuel and in the piping from entering into the valve seat, a filter 28 is provided in the inlet portion of the fuel passage of the electromagnetic fuel valve.

Figure 7:
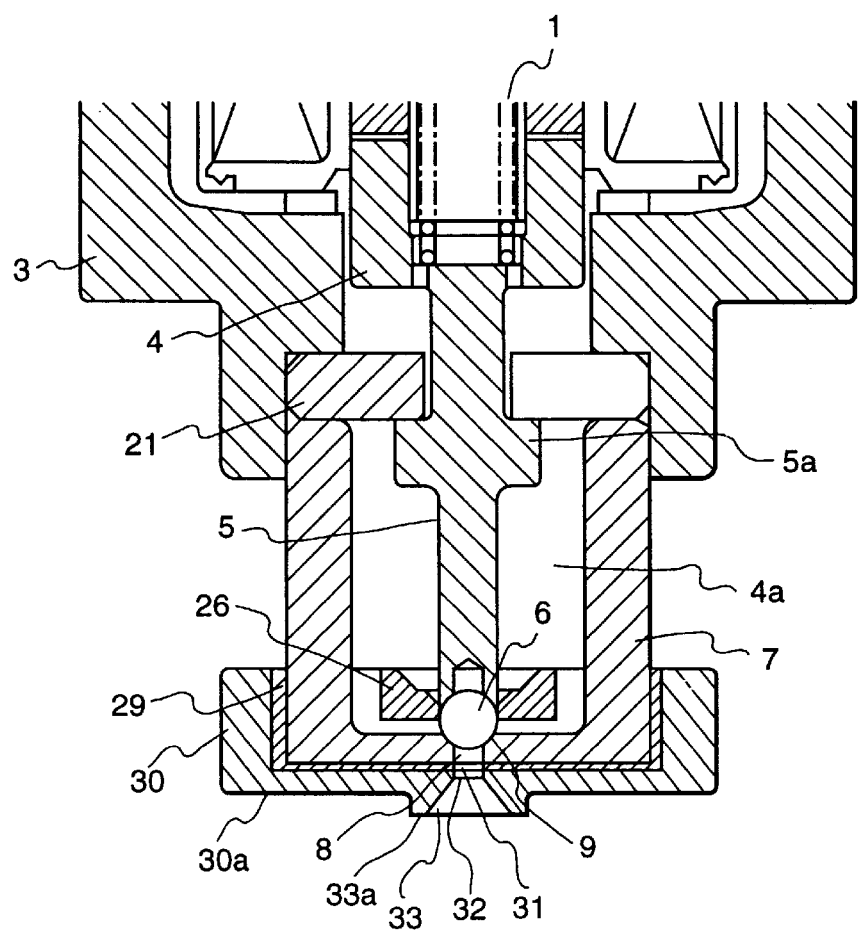
FIG. 7 is an enlarged vertical sectional view showing an embodiment of a top end portion of an in-cylinder fuel injection device in accordance with the present invention.

A cap-shaped nozzle cover 30 is mechanically secured to the end periphery of the nozzle member 7 through an insulator 29, as shown in detail in FIG. 7. The insulator 29 is formed of a comparatively thin material having a low thermal conductivity, for example, a stainless steel or a nickel alloy. On the other hand, the nozzle cover 30 may be formed of a material having a high thermal conductivity, such as a brass or an aluminum alloy, so as to be easily heated by the heat of combustion of the engine. A communicating hole 31 and a fuel injecting hole 32 for injecting fuel are provided in the central portion of the insulator 29 and the central portion of the nozzle cover 30, respectively, and the holes are in communication with the opening 8 on the upstream side. Further, in the nozzle cover 30, there is provided a tapered hole 33 which extends from the fuel injecting hole 32 and is formed with a conical surface the diameter of which increases going toward the exit side, and the top end surface 33a of which projects out slightly from the end surface 30a of the cover.

The end portion of the electromagnetic fuel injection valve 1 formed with such a construction can be easily heated to higher than 550° C. On the other hand, although the electromagnetic fuel injection valve 1 is cooled by fuel contained therein during the intake stroke, the temperature drop in the exposed portion is smaller than that in the prior art, since the fuel is stopped at the valve seat. That is, in the prior art, the surface temperature of the electromagnetic fuel injection valve is lowered to 130 to 200° C. However, in the present embodiment, the electromagnetic fuel injection valve can be maintained for a long time at a high temperature in the range from the vaporization temperature of deposits of 550° C. to the burning temperature of combustion of 1050° C. Further, deposits are hardly produced near the valve seat irrespective of combustion stroke, intake stroke and so on, since the surface thereof is cooled by fuel.

Figure 4:
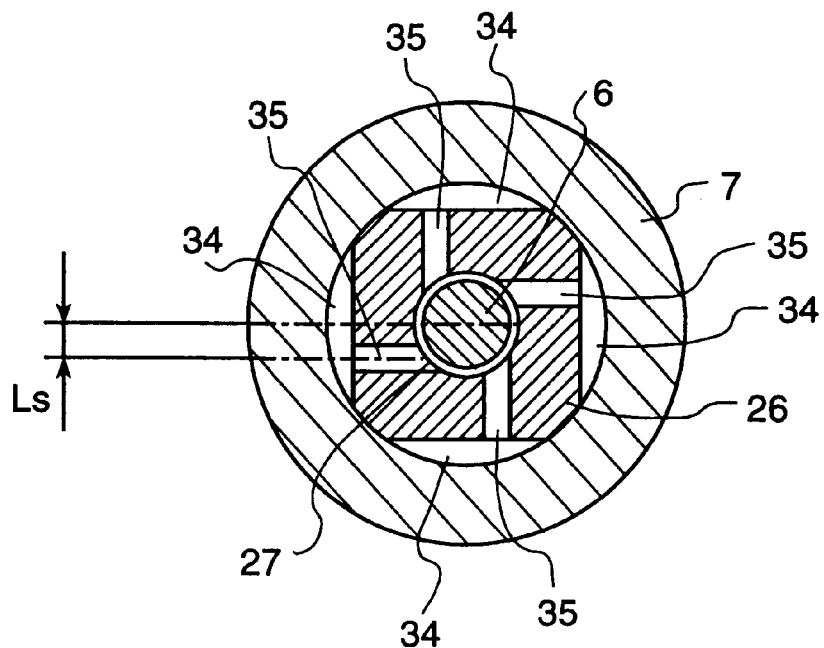
FIG. 4 is a cross-sectional view showing a fuel swirl member taken on the plane of the line A—A of FIG. 3.
Figure 5:
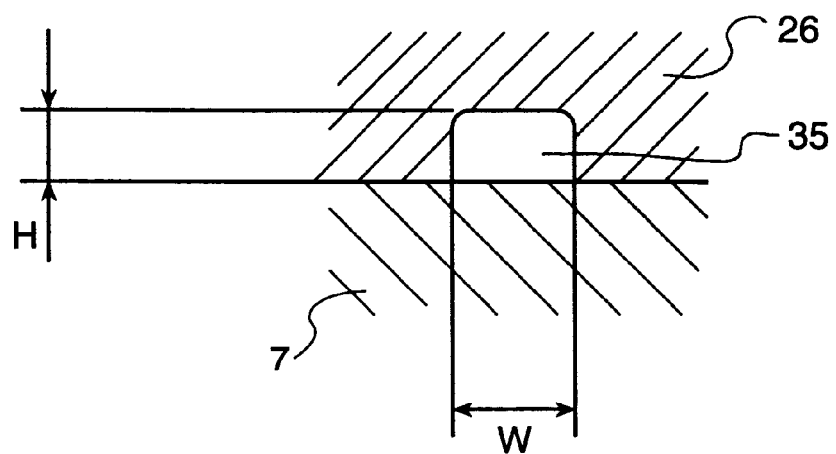
FIG. 5 is a detailed cross-sectional view showing a swirl groove of a fuel swirl member.
Figure 6:
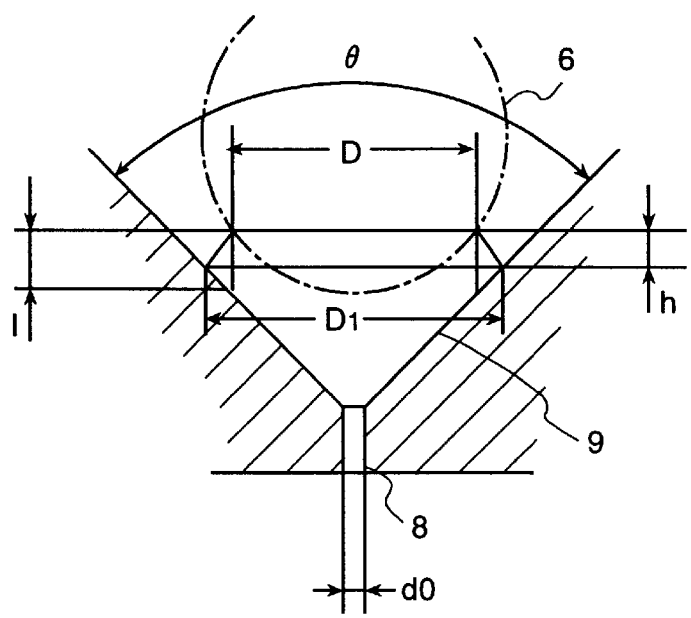
FIG. 6 is an enlarged vertical cross-sectional view showing an embodiment of a valve of an in-cylinder fuel injection device in accordance with the present invention.

The fuel swirl element 26 and the valve portion will be described in detail below, referring to FIG. 4 to FIG. 6. The fuel swirl element 26 has four axial direction grooves 34 and four radial direction grooves 35 arranged symmetrically with respect to the axis. In the present embodiment, although the axial direction groove 34 is formed in a D-cut shape, other configuration, such as an annular passage and so on, may be employed, and the number of passages is not limited to four. The axial direction grooves 34 and the radial direction grooves 35 are fuel passages for introducing fuel from the upstream side of the ball valve 6, and the fuel which passes through the axial direction grooves 34 is caused to flow eccentrically with respect to the axis through the radial direction grooves 35. Thus, the fuel is swirled and atomization thereof is promoted when the fuel is injected through the fuel injecting hole 32 provided in the nozzle cover 30.

The swirl intensity (swirl number S) applied by the fuel swirl element 26 is given by the following equation.

$$S=\text{(angular momentum)}/\text{(momentum in injection axial direction}\times \text{radius of fuel injection hole)}=2\cdot d_0\cdot L_s/n\cdot d_s^2\cdot\cos(\theta/2) \quad (1)$$

where $d_0$: diameter of fuel injection hole $L_s$: eccentricity of groove n: number of grooves θ: angle of valve sheet $d_s$: fluid dynamic equivalent diameter which is expressed by the following equation using a groove width W and a groove height H.

$$d_s=2\cdot W\cdot H/(W+H) \quad (2)$$

When the swirl number is large, atomization is promoted and the fuel spray is dispersed. In practical use, the swirl number is preferably 1.2 to 7.0, and more preferably 1.2 to 3.2.

Since the electromagnetic fuel injection valve of the present invention projects into the combustion chamber, it is inevitable that deposits and soot will attach onto the exit portion of the fuel injecting hole 8. Therefore, measurement of the injecting fuel flow rate in accordance with the present invention is performed using the valve portion, instead of using the fuel injecting hole as in the prior art. That is, letting the distance between the contact points on the plane of the tangent line of the ball valve 6 and the valve seat 9 closing the fuel passage be D, the sine of the distance between the ball valve 6 and the valve seat 9 when the movable portion 4a is lifted up from the closing state by 1 (one) be h, and the diameter at a point intersecting the perpendicular line with the valve seat 9 at that time be $D_1$, the opening passage area SV for the fuel formed in the portion of the ball valve 6 can be expressed as follows.

$$SV=(\pi/2)(D_1+D)\{(D_1-D)^2/4+h^2\}^{1/2} \quad (3)$$

The flow passage area SO at the fuel injecting hole 8 is expressed as follows.

$$SO=\pi\cdot d_0^2/4 \quad (4)$$

Therefore, the fuel rate at the ball portion can be measured when SO>SV. Thereby, even if deposits and soot are attached onto the exit portion of the fuel injecting hole 8 causing the flow resistance to increase in the fuel injecting hole 8, the required amount of fuel for the internal combustion engine can be injected since the fuel is measured at the ball valve portion where there is no effect of the deposits and the soot. It is preferable that the axial length of the narrowest portion of the fuel injecting hole 8 is 0.1 mm to 0.4 mm. By doing so, it is possible to effectively use the swirl applied to the fuel.

The operation of the electromagnetic fuel injection valve 1 will be described below. The valve formed by the ball valve 6 and the valve seat 9 of the electromagnetic fuel injection valve 1 is opened and closed by operating the movable portion 4a corresponding to an electric ON-OFF signal input to the electromagnetic coil 14. By doing so, the fuel injection is controlled. When an electric signal is input to the coil 14, a magnetic circuit is formed by the core 2, the yoke 3 and the plunger 4, the plunger 4 is attracted toward the core 2. As the plunger 4 is moved, the ball valve 6 integrated with the plunger 4 is detached from the surface of the valve seat 9 of the nozzle member 7 to open the fuel injecting hole 32. Fuel is pressurized and adjusted through the fuel pump, not shown, and the regulator for adjusting fuel pressure, and flows into the electromagnetic fuel injection valve 1 through the filter 28, and successively flows through the lower passage of the coil assembly 16, the outer peripheral portion of the plunger 4, the gap between the stopper 21 and the rod 5, the axial direction grooves 34 and the radial direction grooves 35 of the fuel swirl element 26, and is supplied to the valve seat in a form of a swirl flow. Then, the fuel is injected into the combustion chamber of the engine through the fuel injecting hole 32 at the time when the valve is opened.

In the present embodiment, since the heat of combustion of the engine appropriately heats the nozzle cover 30, which is made of a high thermal conductive material, and raises the temperature of the whole nozzle cover 30 to nearly 550° C., the temperature of any deposits exceeds the evaporating temperature of the deposits to produce a self-cleaning. As a result, the attaching and accumulation of deposits and soot can be suppressed. Thereby, a variation over time in the fuel injection from the fuel injecting hole 32 provided in the central portion of the nozzle cover 30 hardly occurs, and so a stable fuel injection can be attained. Further, by employing the taper hole 33 having a diameter which increases continuously toward the exit side from the fuel injecting hole 32, and by causing the top end surface 33a to slightly project out of the end surface 30a of the nozzle cover 30, the heat receiving area is increased.

Figure 8:
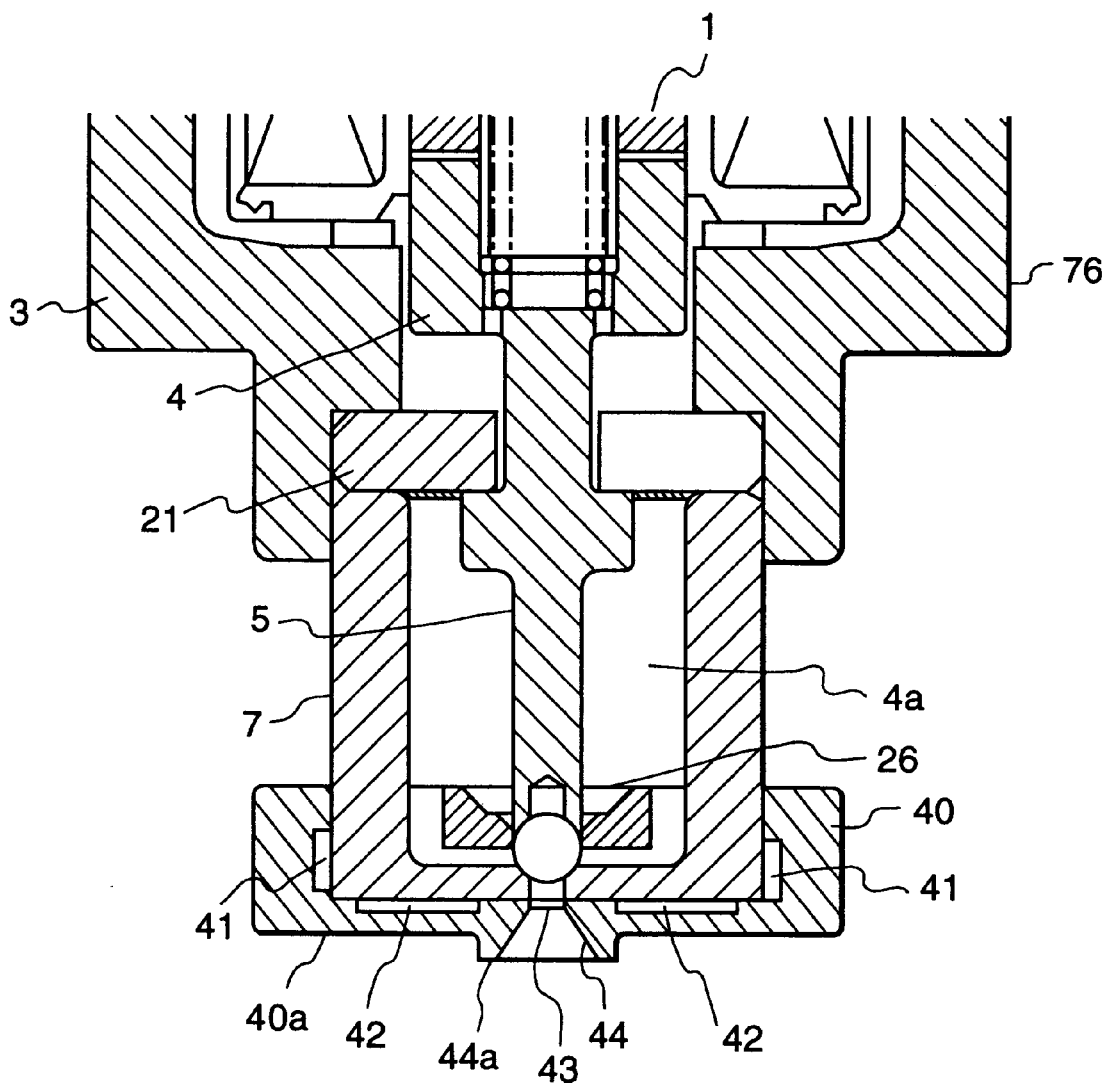
FIG. 8 is an enlarged vertical sectional view showing another embodiment of a top end portion of an in-cylinder fuel injection device in accordance with the present invention.

FIG. 8 is a vertical cross-sectional view showing another embodiment of an in-cylinder fuel injection device in accordance with the present invention. The main difference between this embodiment and the first embodiment described above is that gaps 41, 42 are provided between the nozzle member 7 and the nozzle cover 40. Heat transferred from the nozzle cover 40 to the nozzle member 7 is decreased by the gaps 41, 42. As a result, the temperature of the nozzle cover 40 can be easily increased to a self-cleaning temperature for deposits, and consequently it is possible to suppress the accumulations of deposits on the fuel injecting hole 43 provided in the central portion of the nozzle cover 40. Further, since the taper hole 33 has a diameter which continually increases toward the exit side from the fuel injecting hole 32, and since the shape of the end surface 33a is slightly projected out of the end surface 30a of the nozzle cover 30 in the same manner as in the first embodiment, the heat receiving area is increased. Furthermore, according to this embodiment, since thermal deformation of the members can be absorbed by the gaps, it is possible to realize a highly reliable electromagnetic fuel injection valve which is capable of preventing deposits and soot from accumulating with a simple construction.

Figure 9:
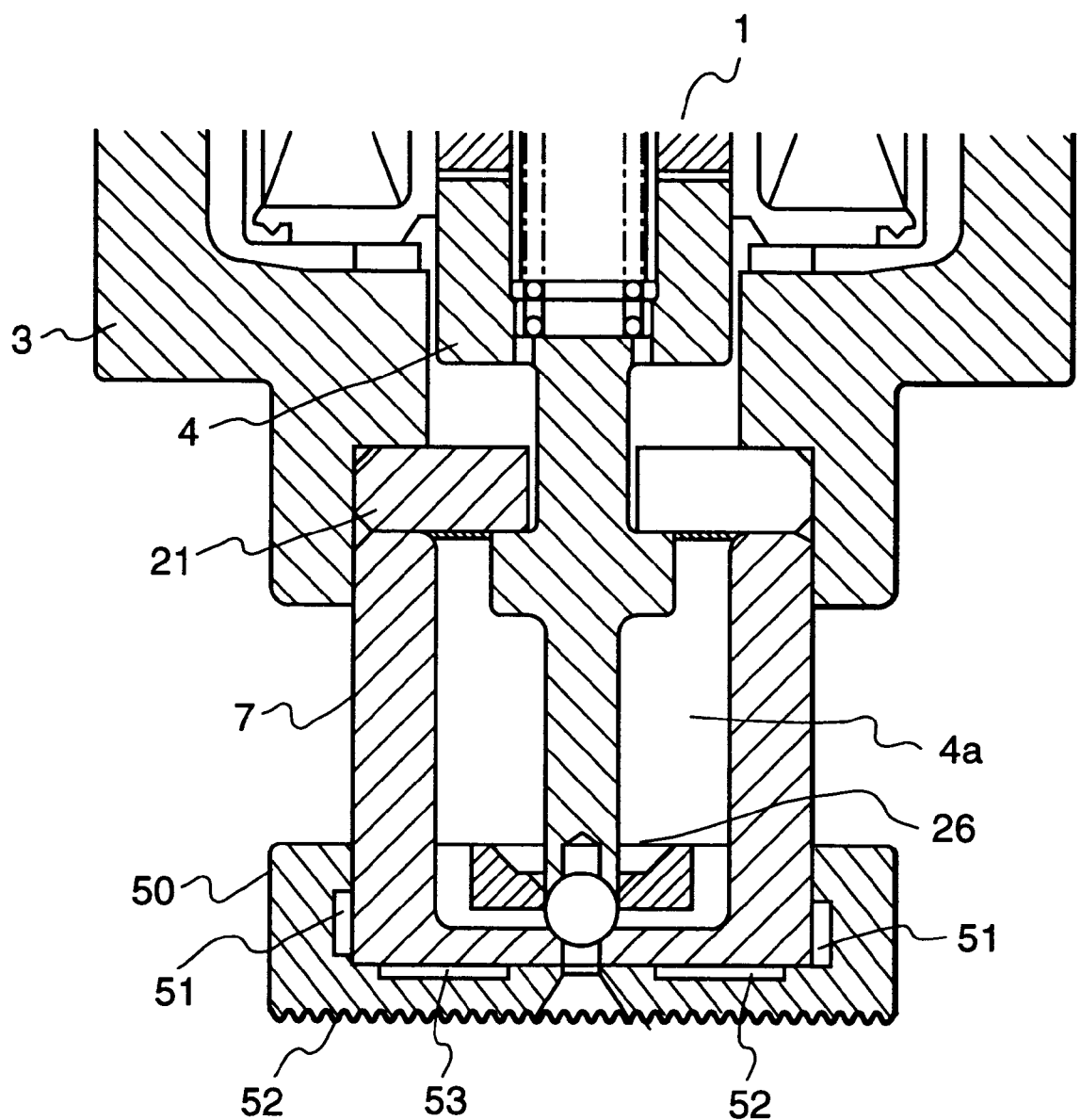
FIG. 9 is an enlarged vertical sectional view showing a modified embodiment of a top end portion of an in-cylinder fuel injection device in accordance with the present invention.

FIG. 9 is a vertical cross-sectional view showing a modified embodiment of the in-cylinder fuel injection device of FIG. 8. In this modified embodiment, a means for increasing the heat receiving area is added to the embodiment shown in FIG. 8. That is, the end surface of the nozzle cover 50 which faces into the combustion chamber is formed with a serrated surface 52. In this embodiment, since gaps 51, 52 are also provided between the nozzle member 7 and the nozzle cover 50, as in the embodiment shown in FIG. 8, the same effect as in the embodiment of FIG. 8 can be obtained.

As for the methods and the means of receiving heat other than the aforementioned embodiment and the modified embodiment described above, there are, for example, a method of vapor-depositing metallic particles having a high thermal conductivity onto the surface of the nozzle cover, a method of performing surface treatment so as to roughen the surface of the nozzle cover, and a method of coating the surface of the nozzle cover with a catalytic material having an oxidizing action.

Figure 10:
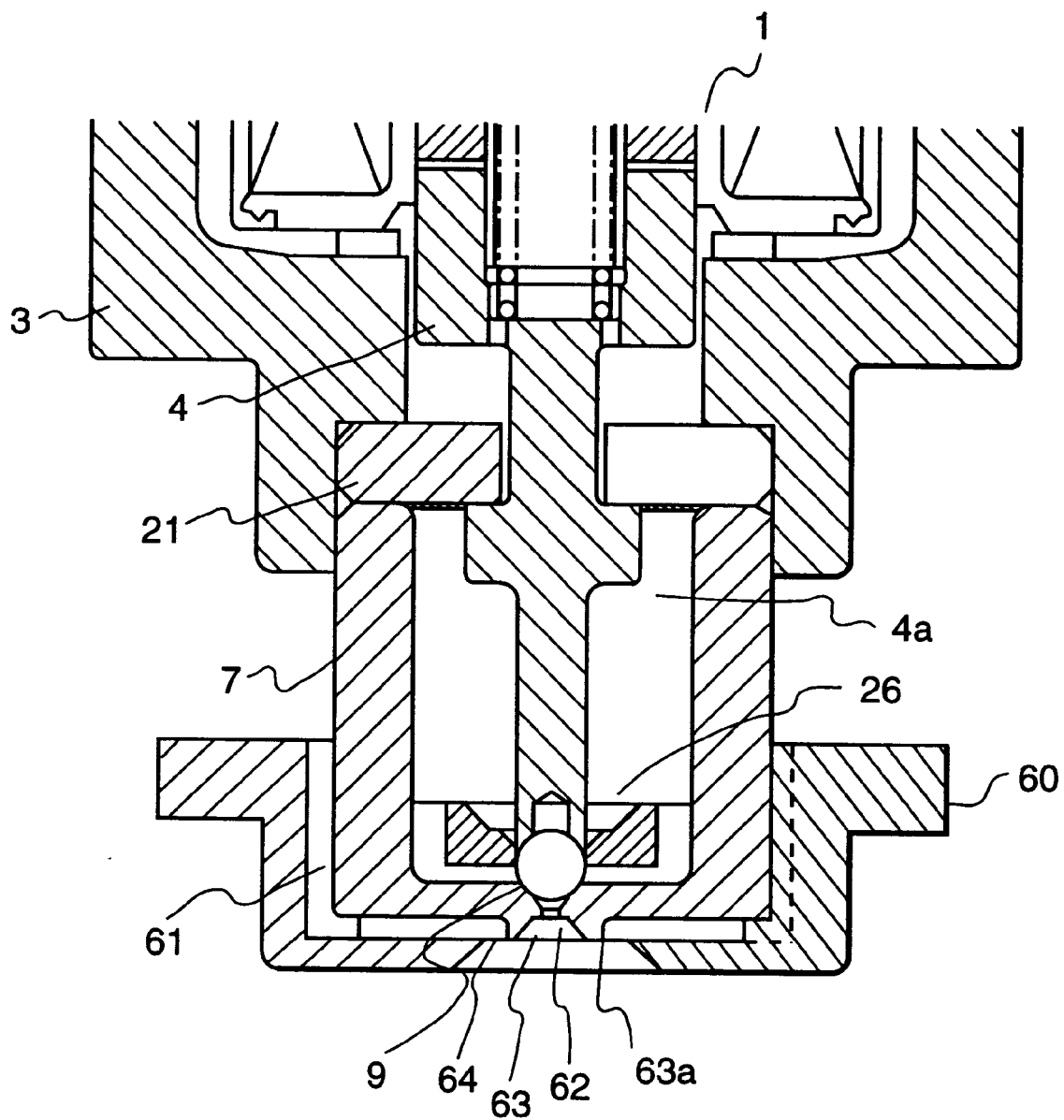
FIG. 10 is an enlarged vertical sectional view showing a further embodiment of a top end portion of an in-cylinder fuel injection device in accordance with the present invention.

FIG. 10 is a vertical cross-sectional view showing a further embodiment of an in-cylinder fuel injection device in accordance with the present invention. The main difference between this embodiment and the embodiments described above is that an air-intake passage 61 is provided between the nozzle injecting hole 7 and the nozzle cover 60. In this embodiment, the fuel injecting hole 62 is formed continuously in the downstream side of the valve seat 9 of the nozzle member 7, and a taper hole 63 ahving an inner diameter which increases continuously toward the exit side is formed adjacent to the fuel injecting hole 62. The nozzle cover 60 has an air-intake passage 61 for guiding air from outside the valve to allow air to flow from the injecting hole 64 into the combustion chamber. When the intake air is flowing into the combustion chamber, the intake air blows off the liquid droplets which have attached on the area surrounding the end surface downstream of the taper hole 63 and which are formed by fuel mist injected from the fuel injecting hole 62. Therefore, it is possible to suppress deposits from attaching and accumulating on the area surrounding the fuel injecting hole. The effect can be further increased by employing a nozzle cover 60 made of a high thermal conductive material or having an improved heat receiving effect, as in the embodiments described above.

Figure 11:
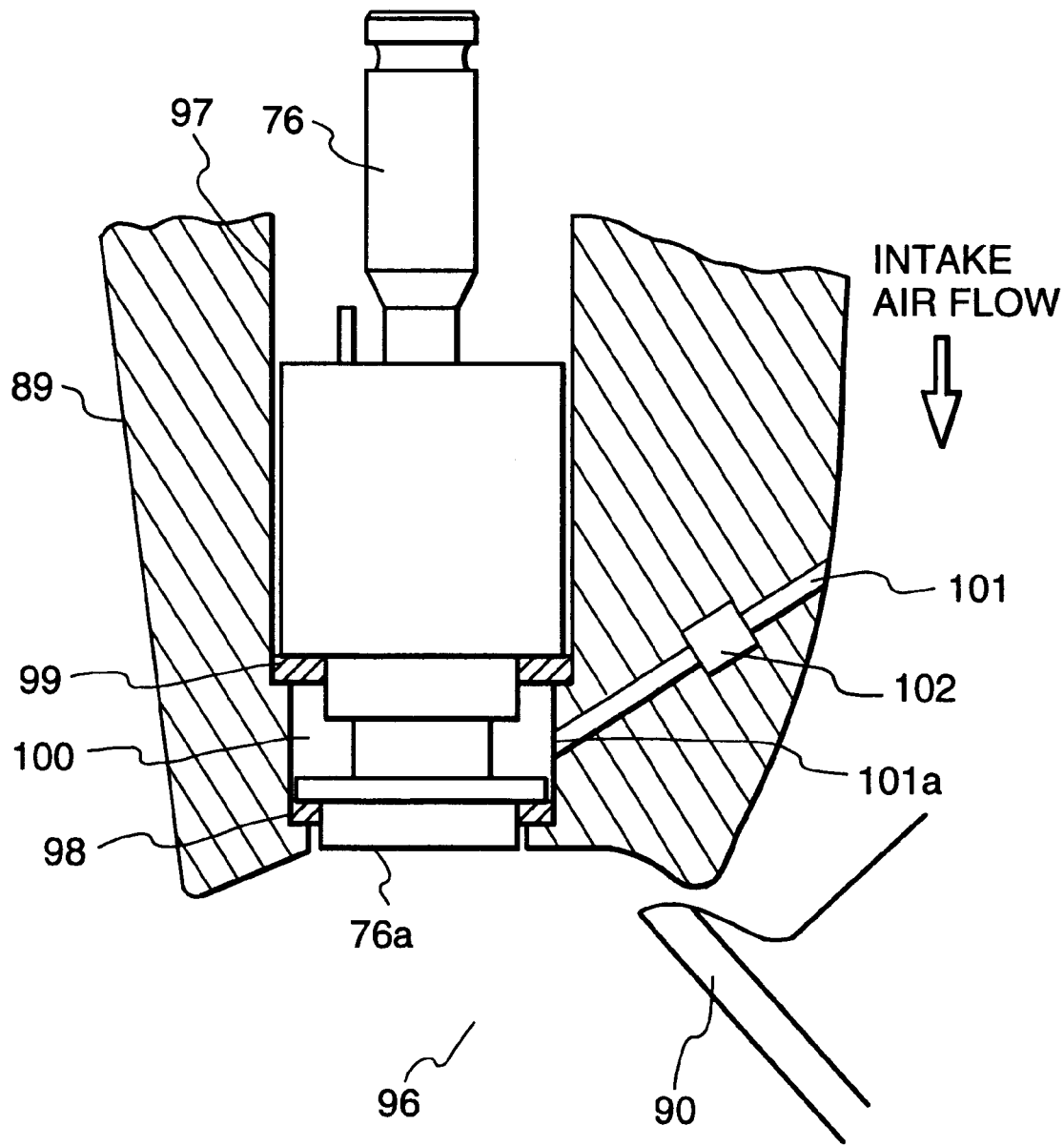
FIG. 11 is a partial sectional view showing a state of mounting the in-cylinder fuel injection device in the system of FIG. 1.

FIG. 11 shows a further embodiment of an in-cylinder fuel injection device in accordance with the present invention in which a part of the intake air is blown from the side surface of the in-cylinder fuel injection device 76. During the air-intake stroke when air is introduced into the cylinder, fuel is injected at the same time when air is taken in. At this moment, a part of the intake-air is introduced into an air-intake chamber 100 formed by the in-cylinder fuel injection device 76, the wall 97 of the cylinder head 89, and sealing members 98, 99. That is, the intake introduced through an air-intake passage 101 and an intake-air control valve unit 102 provided in the cylinder head 89. At that moment, the intake-air blows off the fuel droplets attached onto the area surrounding the in-cylinder fuel injection device 76 to cause them to flow into the combustion chamber together with the fuel droplets. At the beginning of the compression stroke, the inner pressure of the combustion chamber starts to increase. Then, the air-intake control valve unit 102 is operated to prevent the mixed gas from flowing backward into the cylinder head 89. When combustion is started after compressing the mixed gas, combustion heat is immediately transmitted to the in-cylinder fuel injection device 76, and consequently the temperature of the end portion of the in-cylinder fuel injection device is increased. Thereby, the temperature of the end portion of the in-cylinder fuel injection device is easily heated up to the self-cleaning temperature for deposits as described above to suppress deposits and soot from attaching and accumulating around the injection nozzle.

What is claimed is:

1. An in-cylinder fuel injection device, having a fuel passage through which fuel passes, for directly injecting fuel into a combustion chamber of an internal combustion engine, comprising:

a valve member for opening and closing said fuel passage, a fuel swirl member for giving a swirl to fuel passing through said fuel passage, said fuel swirl member being provided in the upstream side of an opening and closing portion of said valve member, a fuel injecting hole member having a through hole for passing fuel, said fuel injecting hole member being provided in the downstream side of said opening and closing portion, and a cover member for covering said fuel injecting hole member, said cover member having an injecting hole and being made of a high thermal conductive material.

2. An in-cylinder fuel injection device according to claim 1, wherein said cover member is made of any one of a brass and an aluminum alloy.

3. An in-cylinder fuel injection device according to claim 1, wherein at least one concave portion is formed on a surface of said cover member in a side thereof contacting said fuel injecting member.

4. An in-cylinder fuel injection device according to claim 1, wherein the surface temperature near the injecting hole of said cover member is raised to at least 550° C. during operation of the internal combustion engine.

5. An in-cylinder fuel injection devices, having a fuel passage through which fuel passes, for directly injecting fuel into an combustion chamber of an internal combustion engine, comprising:

a valve member for opening and closing said fuel passage, a fuel swirl member for giving a swirl to fuel passing through said fuel passage, said fuel swirl member being provided in the upstream side of an opening and closing portion of said valve member, a fuel injecting hole member having a through hole for passing fuel, said fuel injecting hole member being provided in the downstream side of said opening and closing portion, said fuel injecting hole member having a thermal conductance improving portion for improving the thermal conductance to the surface thereof facing the combustion chamber of the internal combustion engine.

6. An in-cylinder fuel injection device according to claim 5, wherein said thermal conductance improving portion is constituted by increasing a surface area thereof by forming on the surface area any ones of projections and depressions.

7. An in-cylinder fuel injection device according to claim 5, wherein said thermal conductance improving portion is constituted by a surface vapor-deposited layer for increasing thermal conductance.

8. An in-cylinder fuel injection device, having a fuel passage through which fuel passes, for directly injecting fuel into an combustion chamber of an internal combustion engine, comprising:

a valve member for opening and closing said fuel passage, a fuel swirl member for giving a swirl to fuel passing through said fuel passage, said fuel swirl member being provided in the upstream side of an opening and closing portion of said valve member, a fuel injecting hole member having a through hole for passing fuel, said fuel injecting hole member being provided in the downstream side of said opening and closing portion, a cover member for covering said fuel injecting hole member, said cover member having an injecting hole made of a high thermal conductive material, and thermal convection preventing means for preventing thermal convection from said cover member to said fuel injecting hole member provided between said cover member and said fuel injecting hole member.

9. An in-cylinder fuel injection device according to any one of claim 1, claim 5 and claim 8, wherein the distance in the axial direction of the narrowest portion of the through hole provided in said fuel injecting hole member is within the range of 0.1 to 0.4 mm.

10. An in-cylinder fuel injection device, having a fuel passage through which fuel passes, for directly injecting fuel into an combustion chamber of an internal combustion engines, comprising:

a valve member for opening and closing said fuel passage, a fuel swirl member for giving a swirl to fuel passing through said fuel passage, said fuel swirl member being provided in the upstream side of an opening and closing portion of said valve member, a fuel injecting hole member having a through hole for passing fuel, said fuel injecting hole member being provided in the downstream side of said opening and closing portion, and a cover member for covering said fuel injecting hole member, said cover member having an injecting hole made of a high thermal conductive material, wherein an amount of fuel to be injected into the internal combustion engine is measured in the opening and closing portion of said valve member.

11. An internal combustion engine comprising a cylinder, a cylinder head for covering an upper portion of said cylinder, an intake manifold forming an intake air passage for guiding intake air into said cylinder, an exhaust manifold forming an exhaust gas passage for guiding exhaust gas out of said cylinder, an intake valve for opening and closing said intake air passage, an exhaust valve for opening and closing said exhaust gas passage, and a spark plug, wherein a fuel injection device is provided for directly injecting fuel into a combustion chamber formed by said cylinder head and said cylinder, said fuel injection device comprising a fuel flow passage for passing fuel therethrough, a valve member for opening and closing said fuel passage, a fuel swirl member for giving a swirl to fuel passing therethrough said fuel passage, said fuel swirl member being provided in the upstream side of an opening and closing portion of said valve member, a fuel injecting hole member having a through hole for passing fuel, said fuel injecting hole member being provided in the downstream side of said opening and closing portion, and a cover member for covering said fuel injecting hole member, said cover member being made of any one of a brass and an aluminum alloy.

12. An internal combustion engine comprising a cylinder, a cylinder head for covering an upper portion of said cylinder, an intake manifold forming an intake air passage for guiding intake air into said cylinder, an exhaust manifold forming an exhaust gas passage for guiding exhaust gas out of said cylinder, an intake valve for opening and closing said intake air passage, an exhaust valve for opening and closing said exhaust gas passage, and a spark plug, wherein a fuel injection device is provided for directly injecting fuel into a combustion chamber formed by said cylinder head and said cylinder, said fuel injection device comprising a fuel flow passage for passing fuel therethrough, a valve member for opening and closing said fuel passage, a fuel swirl member for giving a swirl to fuel passing through said passage, said fuel swirl member being provided in the upstream side of an opening and closing portion of said valve member, a fuel injecting hole member having a through hole for passing fuel, said fuel injecting hole member being provided in the downstream side of said opening and closing portion, and a cover member for covering said fuel injecting hole members, said cover member being made of any one of a brass and an aluminum alloy, and thermal convection preventing means for preventing thermal convection from said cover member to said fuel injecting hole member provided between said cover member and said fuel injecting hole member.

* * * * *